(12) United States Patent
Lototskyy et al.

(10) Patent No.: US 11,611,092 B2
(45) Date of Patent: Mar. 21, 2023

(54) METAL HYDRIDE HYDROGEN STORAGE ARRANGEMENT FOR USE IN A FUEL CELL UTILITY VEHICLE AND METHOD OF MANUFACTURING THE SAME

(71) Applicant: UNIVERSITY OF THE WESTERN CAPE, Cape Town (ZA)

(72) Inventors: Mykhaylo Volodymyrovich Lototskyy, Durbanville (ZA); Yevgeniy Klochko, Goodwood (ZA); Ivan Tolj, Kastel Stari (HR); Moegamat Wafeeq Davids, Goodwood (ZA); Adrian J. Parsons, Three Anchor Bay (ZA)

(73) Assignee: UNIVERSITY OF THE WESTERN CAPE, Praetoria (ZA)

( * ) Notice: Subject to any disclaimer, the term of this patent is extended or adjusted under 35 U.S.C. 154(b) by 980 days.

(21) Appl. No.: 16/387,617

(22) Filed: Apr. 18, 2019

(65) Prior Publication Data
US 2019/0334185 A1     Oct. 31, 2019

(30) Foreign Application Priority Data

Apr. 26, 2018 (GB) .................................. 1806840

(51) Int. Cl.
*H01M 8/04082* (2016.01)
*B60L 50/70* (2019.01)
(Continued)

(52) U.S. Cl.
CPC ......... *H01M 8/04216* (2013.01); *B60L 50/70* (2019.02); *F17C 11/005* (2013.01);
(Continued)

(58) Field of Classification Search
CPC .......... H01M 8/04216; H01M 2250/20; B60L 50/70; F17C 11/005; F28F 7/02; B60Y 2200/15; B60Y 2400/202
See application file for complete search history.

(56) References Cited

U.S. PATENT DOCUMENTS

| | | |
|---|---|---|
| 1,159,865 A | 11/1915 | Pier |
| 5,082,048 A | 1/1992 | Iwaki et al. |
| (Continued) | | |

FOREIGN PATENT DOCUMENTS

| | | |
|---|---|---|
| EP | 1215163 B1 | 8/2005 |
| GB | 2135901 A | 9/1984 |
| (Continued) | | |

OTHER PUBLICATIONS

Decision_to_grant_a_European_patent (Year: 2022).*
(Continued)

*Primary Examiner* — Alexander Usyatinsky
(74) *Attorney, Agent, or Firm* — Lando & Anastasi, LLP

(57) ABSTRACT

The invention relates to a metal hydride hydrogen storage and supply arrangement integrated for use in a fuel cell utility vehicle. The storage arrangement includes a plurality of metal hydride containers suitable to be filled with a metal hydride material, the containers being connectable in parallel to a gas manifold; heat transfer means located between the metal hydride containers; and a filler body located in a space between the metal hydride containers and the heat transfer means.

11 Claims, 4 Drawing Sheets

(51) Int. Cl.
  *F28F 7/02* (2006.01)
  *F17C 11/00* (2006.01)
(52) U.S. Cl.
  CPC .............. *F28F 7/02* (2013.01); *B60Y 2200/15* (2013.01); *B60Y 2400/202* (2013.01); *H01M 2250/20* (2013.01)

(56) References Cited

U.S. PATENT DOCUMENTS

| | | | |
|---|---|---|---|
| 5,445,099 | A | 8/1995 | Rendina |
| 8,636,834 | B2 * | 1/2014 | Fruchart ............... C01B 3/0005 423/658.2 |
| 2003/0215684 | A1 | 11/2003 | Yang et al. |
| 2004/0139761 | A1 | 7/2004 | Hiramatsu |
| 2004/0142291 | A1 | 7/2004 | Yang et al. |
| 2006/0065553 | A1 * | 3/2006 | Golben ................. F17C 11/005 206/0.7 |
| 2009/0035623 | A1 * | 2/2009 | Tsuji ................. H01M 8/04216 429/483 |
| 2009/0166110 | A1 | 7/2009 | Gregory et al. |
| 2010/0273079 | A1 * | 10/2010 | Hinsenkamp ..... H01M 8/04029 429/442 |
| 2014/0137562 | A1 | 5/2014 | Law et al. |
| 2016/0129417 | A1 * | 5/2016 | Aimone .................. B01J 19/02 422/240 |

FOREIGN PATENT DOCUMENTS

| | | | |
|---|---|---|---|
| JP | S62197265 | * | 8/1987 |
| JP | S62197265 | A | 8/1987 |
| JP | H08250140 | A | 9/1996 |
| KR | 20110005754 | A | 1/2011 |

OTHER PUBLICATIONS

Brayton, Daniel et al., Low Cost, Metal Hydride Based Hydrogen Storage System for Forklift Applications (Phase II), H2C, Hawaii Hydrogen Carriers, US DOE Annual Merit Review Meeting, Mar. 15, 2013.

Narvaez, Adrian, Low Cost, Metal Hydride Based Hydrogen Storage System for Forklift Applications (Phase II), H2C, Hawaii Hydrogen Carriers, US DOE Annual Merit Review Meeting, Jun. 18, 2014.

Polson, Crantson et al., Low Cost, Metal Hydride Hydrogen Storage System for Forklift Applications, H2C, Joint Venture Partners: Select Engineering Services (SES) and Hawaii Hydrogen Carriers, LLC (HHC), US DOE Annual Merit Review Meeting, May 11, 2011.

Extended European Search Report from corresponding European Application No. 19170287.7 dated Oct. 10, 2019.

* cited by examiner

METAL HYDRIDE HYDROGEN STORAGE ARRANGEMENT FOR USE IN A FUEL CELL UTILITY VEHICLE AND METHOD OF MANUFACTURING THE SAME

CROSS-REFERENCE TO RELATED APPLICATION

This application claims the benefit under 35 U.S.C. § 119 of United Kingdom Patent Application No. 1806840.3 filed on Apr. 26, 2018 which is hereby incorporated herein by reference in its entirety for all purposes.

BACKGROUND TO THE INVENTION

The invention relates to a metal hydride hydrogen storage and supply arrangement integrated for use in a fuel cell utility vehicle, and more particularly but not exclusively to a metal hydride hydrogen storage and supply arrangement for use in utility vehicles, for example forklifts, which require counterweight to provide a low centre of gravity/balancing for the safe operation of the vehicle.

The use of fuel cells in heavy duty utility vehicles, including material handling units/forklifts, has a number of advantages over similar battery-driven vehicles including the provision of constant power during an entire shift, and shorter refuelling time as compared to the time required to recharge a battery.

Most of the fuel cell power systems for forklifts known in the art utilize compressed hydrogen that is stored in gas cylinders (CGH2) at pressures up to 350 bar. However, in comparison to lead-acid batteries, which are conventionally used in the electric forklifts, commercially available forklift fuel cell power systems with CGH2 hydrogen storage arrangements are too light to provide sufficient counterweight, and therefore require additional ballast for a proper counterbalancing to provide vehicle stability when lifting rated loads.

The application of metal hydrides (MH) for hydrogen storage in the fuel cell powered forklifts and similar utility vehicles (for example underground mining vehicles) at first glance appears to be a promising option. The "low-temperature" intermetallic hydrides with hydrogen storage capacities below 2 wt % (i.e. storage of 1 kg H requires more than 50 kg of the MH material) can provide compact $H_2$ storage simultaneously serving as a ballast. Thus, the low weight capacity of intermetallic hydrides, which is usually considered as a major disadvantage to their use in vehicular hydrogen storage applications, is an advantage for use in heavy duty utility vehicles.

The use of metal hydrides for the storage of hydrogen fuel where the MH additionally serves as a ballast/counterweight was disclosed in a number of patents including hydrogen engine system with metal hydride container (U.S. Pat. No. 5,082,048 to Iwaki et al), hydrogen hydride keel for ships (U.S. Pat. No. 5,445,099 to Rendina), industrial truck with a hydrogen storage arrangement (EP1215163 B1 to Pfeiffer et al), material handling vehicle including integrated hydrogen storage (US 2009/0166110 A1 to Gregory et al). General features of these solutions include the placement of a metal hydride hydrogen storage material in a plurality of metal hydride containers that supply hydrogen fuel to a hydrogen engine or fuel cell, and which are equipped with means for heating the storage arrangements to provide $H_2$ desorption from the metal hydride by transferring the heat released during the engine/fuel cell operation to the MH containers.

Layouts of modern forklifts (see for example EP1215163 B1 to Pfeiffer et al) are characterised by strict space constrains and, at the same time, require sufficient counterweight (about 2 tonnes for electric forklifts with 3 tonnes lifting capacity), which is usually provided by heavy lead-acid batteries. As mentioned above, the commercial fuel cell power modules available in the market are equipped with additional ballast to mitigate the counterweight problem when replacing the battery with a fuel cell and its Balance of Plant (BoP) components. The ballast is usually made as a metal body made of cast iron which leaves quite a small vacant space that is mostly occupied by CGH2 hydrogen storage arrangement.

A metal hydride hydrogen storage system for forklift applications was developed by Hawaii Hydrogen Carriers LLC, together with other companies and institutions, within US DoE funded project "Low Cost, Metal Hydride Hydrogen Storage System for Forklift Applications". See C. Polson, C. Jensen. *Presentation at US DOE Annual Merit Review Meeting*, May 11, 2011, Project ID #: ST 09, D. Brayton, A. Narvaez. *Presentation at US DOE Annual Merit Review Meeting*, May 15, 2013, Project ID #: ST 095 and A. Narvaez. *Presentation at US DOE Annual Merit Review Meeting*, Jun. 18, 2014, Project ID #: ST 095. In this design, the system/metal hydride hydrogen storage arrangement is made as a staggered array (5×8) of tubular containers (2" in the diameter, 40 in total) filled with an $AB_5$-type metal hydride material and placed in a water storage arrangement equipped with inlet and outlet cooling/heating water ports. The hydride storage arrangement has dimensions 470 mm (L)×700 mm (W)×370 mm (H), contains about 2 kg (~20 $Nm^3$) $H_2$ and has an estimated weight of about 500 kg when filled with water. The storage arrangement, together with other components of the fuel cell power module, was integrated in a Crown electric forklift with lifting capacity of 5000 lb (~2.3 tonnes). To provide sufficient counterweight, all the components were assembled within a rectangular metal casting body, and the majority of its internal volume was occupied by the MH storage arrangement.

As it can be seen from the prior art example presented above, even with the use of MH for hydrogen storage, the problem of counterweight cannot be solved completely, resulting in the necessity to still introduce an additional metal casting body, thus resulting in too limited space for the placement of the fuel cell and its BoP. The cramped placement of the latter, in turn, creates problems in accessing the components during assembly and service. As a rule, even for minor service or repair works, the heavy (~2 tonnes) fuel cell power module has to be removed from a vehicle and partially disassembled.

It is, accordingly, an object of the invention to provide a metal hydride hydrogen storage and supply arrangement integrated for use in a fuel cell utility vehicle which will, at least partially, alleviate the above shortcomings.

It is a further object of the invention to provide a metal hydride hydrogen storage and supply arrangement which will be a useful alternative to existing metal hydride hydrogen storage and supply storage arrangements.

It is also an object of the invention to provide a method of manufacturing a metal hydride hydrogen storage arrangement suitable for use in a fuel cell utility vehicle.

SUMMARY OF INVENTION

According to the invention there is provided a metal hydride hydrogen storage arrangement suitable for use in a fuel cell utility vehicle, the storage arrangement including:

a plurality of metal hydride containers suitable to be filled with a metal hydride material, the containers being connectable in parallel to a gas manifold;

heat transfer means located between the metal hydride containers; and a filler body located in a space between the metal hydride containers and the heat transfer means.

There is provided for the filler body to be located in close proximity of external surfaces of the containers and the heat transfer means.

The heat transfer means may be heating and/or cooling means. Note that in the specification, the terms heat transfer means and heating/cooling means are used interchangeably.

The filler body may be in the form of a metal body formed by a melting and solidification of a metal or an alloy.

The metal or the alloy may have a high density, for example >8 kg/L (e.g. 8.64 kg/L—Cadmium), preferably >11 kg/L (e.g. 11.34 kg/L—Lead).

The metal or the alloy may have a high thermal conductivity, for example >35 W/(m K) (e.g. Lead), preferably 100-120 W/(m K) (e.g. Cadmium, Zinc, multicomponent alloys).

The metal or the alloy may have a melting/solidification point below the maximum allowed operation temperature of the metal hydride container, but above the activation temperature of the metal hydride material. More particularly, the metal or the alloy which forms the filling body may be lead or a lead-containing alloy with a melting point between 150 and 350° C., in which case the activation temperature of the metal hydride material may be between 100 and 300° C.

A further feature of the invention provides for the metal hydride container to comprise an all-welded stainless steel structure.

There is provided for the heat transfer means to include a heat transfer fluid conduit, for example tubing, for conveying a heat transfer fluid.

The tubing may be staggered in between the metal hydride containers.

According to a further aspect of the invention there is provided a method of manufacturing a metal hydride hydrogen storage arrangement suitable for use in a fuel cell utility vehicle, the method including the steps of:

locating a plurality of metal hydride containers and heat transfer means inside a casting mould to form a pre-assembly;

evacuating an inner space of the containers;

filling the space between the containers and the heat transfer means with a filler material; and removing the casting mould.

There is provided for the step of filling the inner space with a filler material to include the steps of:

pre-heating the pre-assembly;

filling the space between the containers and the heat transfer means with the filler material;

cooling the pre-assembly filled with the filler material to a temperature below the melting/solidification point;

filling the inner volume of the metal hydride containers via the gas manifold with a pressurised gas; and cooling the pre-assembly filled with the solidified filler material and the pressurised gas to room temperature.

The pre-assembly of the metal hydride hydrogen storage arrangement may be opened from the top, and the pre-heating step may be carried out by directing a flow of hot air to the top of the pre-assembly.

The flow of hot air may emanate from a gas burner which may be placed in an air-boosting chamber equipped with an air blower.

There is provided for the step of pre-heating the pre-assembly to be carried out until reaching a temperature of between a half and two thirds of the melting point of the metal or the alloy which forms the filler body. In this case, the metal or the alloy may be pre-melted, and the filing step may be carried out by an open casting of the melt into the pre-assembly of the metal hydride hydrogen storage arrangement.

Alternatively, the step of pre-heating the pre-assembly may be carried out until reaching a temperature above the melting point of the metal or the alloy which forms the filer body. In this case, filling the metal or the alloy may be carried out by the loading of solid pieces of the metal or the alloy into the inner space of the pre-assembly, followed by its melting inside the pre-assembly of the metal hydride hydrogen storage arrangement.

The pressurised gas for filling the inner volume of the containers may be hydrogen.

Alternatively, the pressurised gas may be an inert gas, or a mixture of hydrogen and an inert gas.

In the case where an inert gas or gas mixture is used, the method may include a final activation procedure which includes the steps of:

releasing the pressurised gas from the inner volume of the containers via the gas manifold;

evacuating the inner volume of the containers via the gas manifold; and filling the inner volume of the containers with pressurised hydrogen via the gas manifold.

The hydrogen storage arrangement may be made as a separate hydrogen storage unit, or an assembly of the smaller storage arrangements/modules made as described above.

A further aspect of the invention comprises a metal hydride hydrogen storage arrangement comprising a plurality of storage arrangement as described above.

BRIEF DESCRIPTION OF DRAWINGS

One embodiment of the invention will now be described by way of a non-limiting example, with reference to the accompanying drawings in which.

DETAILED DESCRIPTION OF THE INVENTION

Figure 1:
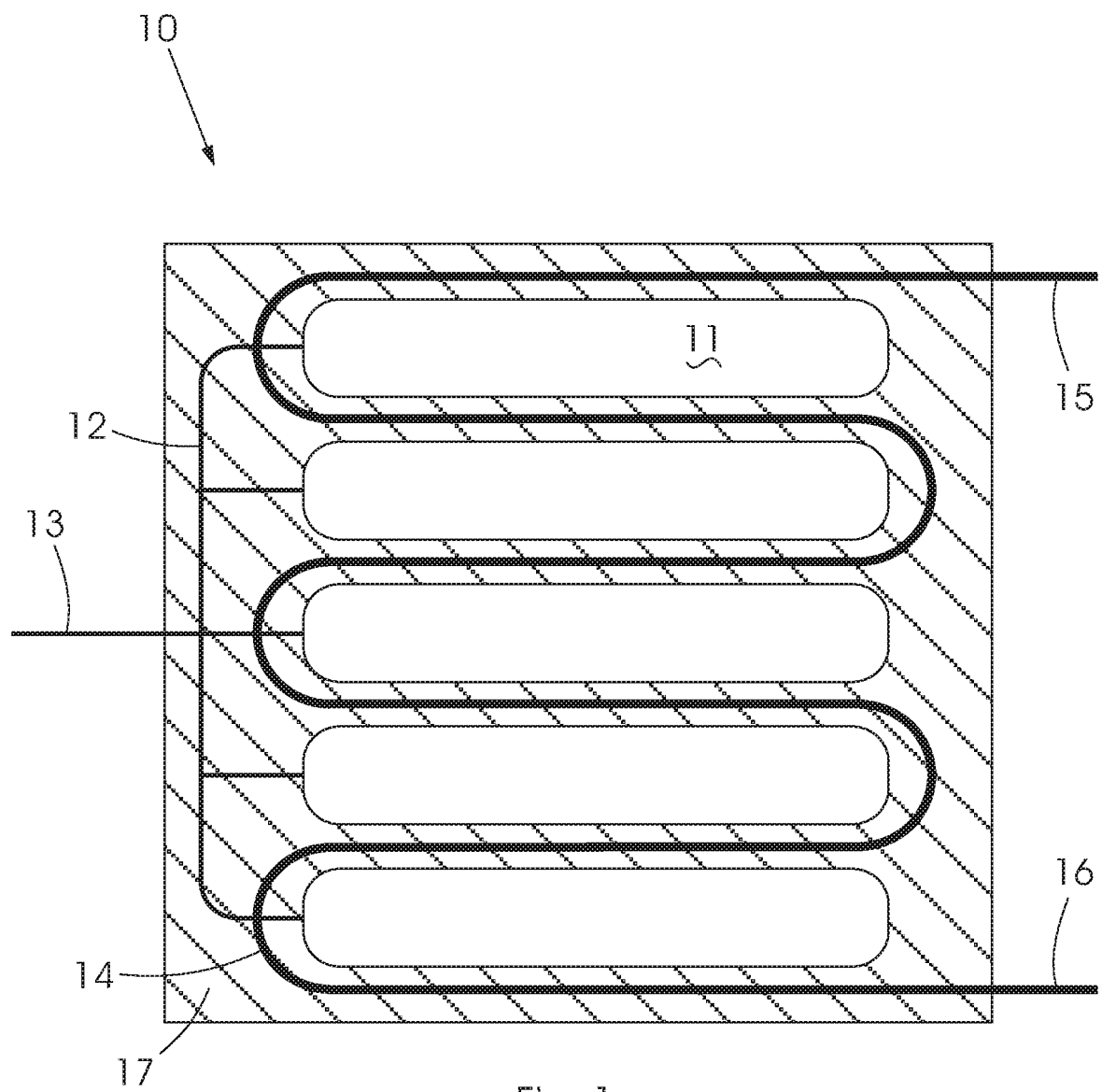
FIG. 1 is a schematic layout of the hydrogen storage arrangement in accordance with an embodiment of the invention.

Referring to the drawings, in which like numerals indicate like features, a non-limiting example of a hydrogen storage arrangement in accordance with an embodiment of the invention is generally indicated by reference numeral 10.

The storage arrangement 10, shown in cross-section in FIG. 1, includes a plurality of metal hydride containers 11.

Any known layout of metal hydride ("MH") containers with external heating/cooling can be used in the invention, and the invention is therefore not limited to a particular layout of configuration. However, the use of tubular containers that are heated and cooled from the outside is a preferable configuration, as this is the simplest and most cost effective option.

The gas input/output pipelines of the containers 11 are connected to a common gas manifold 12 that terminates in an external pipeline 13, which enables $H_2$ charging and discharging of the storage arrangement 10 during absorption or desorption in or out of the MH containers, respectively.

Since $H_2$ absorption in MH is an exothermic process, and $H_2$ desorption is endothermic, the storage arrangement must include heat transfer means 14 for cooling the MH containers 11 during $H_2$ charging. The storage arrangement also requires means for heating the containers when discharging $H_2$. The maximum efficiency of the cooling and the heating is achieved when the heat transfer means (in the form of heating/cooling means 14) are uniformly distributed in between the MH containers 11 in order to provide approximately the same heat transfer distances to the different containers. Although any kind of the heating/cooling means (heat pipes, electric heaters, thermoelectric modules, etc.) can be used within the scope of the invention, in the preferred embodiment, the heating/cooling means 14 is in the form of a tubing for conveying a heating/cooling fluid (e.g., hot and cold water). The heating/cooling means 14 are in flow communication with a supply conduit 15 and a discharge conduit 16.

The space between the metal hydride containers 11 and the heating/cooling means 14 is filled with a metal or an alloy which forms a filler body 17 made of a solidified molten metal or alloy, and which closely adjoins the external surfaces of the MH containers 11 and the heating/cooling means 14. Since the metal hydride storage arrangement simultaneously serves as hydrogen storage medium and as a ballast, the metal or alloy should have a high density to provide maximum weight of the storage arrangement at a minimal volume. The metal or alloy also has to have a high thermal conductivity to maximise the rate of the heat exchange between the MH containers 11 and the heating/cooling means 14.

The filler body 17 envelops all other components of the MH storage arrangement including the MH containers 11, the gas manifold 12 and the heating/cooling means 14. Only the ends, 15 and 16, of the heat transfer conduit 14 and an end 13 of the external pipeline protrudes from the filler body 17. Although this does not have to be the case, this embodiment is preferred due to a number of reasons including the sealing of possible micro-leaks in the pipelines and their joints during formation of the filler body 17. However, other embodiments may include configurations where the filler body only partially envelops other components of the MH storage arrangement. When designing the storage arrangement, criteria determining the size of the filling body/degree of the envelopment include: (i) the weight required to be added to the fuel cell power module, (ii) density of the metal or alloy which forms the filler body; and (iii) space available to the hydrogen storage arrangement. All these criteria can be taken into account during the design stage to yield target dimensions of all the components (11-17) of the storage arrangement.

The most effective way of manufacturing the hydrogen storage arrangement schematically shown in FIG. 1 is to fill the space between the MH containers 11 and the heating/cooling means 14 with the molten metal or alloy, followed by its solidification to form the filling body 17. Such a procedure is characterised by relatively low labour consumption and costs as compared to alternative ones (e.g., machining of a solid piece of metal to create channels for the MH material and the heating/cooling fluid). It also provides good thermal contact between the filler body 17, the MH containers 11 and the heating/cooling means 14. The details of the filling procedure will be described below.

The use of the "melting-solidification" process, together with properties of the selected MH material and features of the MH container which can be used in the invention, present some limitations as to the selection of the metal or alloy for the filler body. First of all, the melting/solidification point (MP) of the metal or alloy for making the filler body 17 must not be higher than the maximum allowed operation temperature of the MH container 11. Among the materials commonly used for the manufacturing solid state hydrogen storage containers, the maximum allowed operation temperature (Tmax=537° C.) is associated with stainless steel. Accordingly, in a preferred embodiment of the invention stainless steel is used as a material to manufacture the MH containers 11. Since any additional joint (gasket, sealed thread coupling, etc.) reduces the temperature rating, the preference is given to the all-welded stainless steel structure.

The maximum allowed operation temperature (Tmax=537° C. in the case of SS) also limits the metals or alloys which are suitable for casting the filler body 17. For example, copper (MP=1084.6° C.) is not suitable despite its very high thermal conductivity (TC=400 W/(m K)) and relatively high density (8.9 kg/L). The molten copper will end up reducing the strength of the stainless steel containers, which is obviously not desirable.

The inventors have found that one of the most suitable metals for the making the filler body 17 is lead, which combines a high density (11.3 kg/L) with a not too high melting point (327.5° C.). Thermal conductivity of the lead is modest (35 W/(m K)) but it is similar to the most heat conductive stainless steels (TC=12-45 W/(m K)). Further optimisation of the material for making the filler body within the scope of this invention can be done by using lead alloys with tin (minimum MP=183° C. for the alloy containing 37 wt. % Pb and 63 wt. % Sn; TC increases in ~1.5 times as compared to pure Pb), cadmium (minimum MP=246° C. at 17 wt. % Cd in Pb), antimony (minimum MP=252° C. at 11 wt. % Sb in Pb), or multicomponent lead-containing alloys, like Cerrosafe (Pb 37.7 wt. %, Bi 42.5 wt. %, Sn 11.3 wt. %, Cd 8.5% wt. %; MP=158-190° C.) or Wood's alloy (Pb 26.7 wt. %, Bi 50 wt. %, Sn 13.3 wt. %, Cd 10% wt. %; MP=70° C.). The use of lead alloys with various compositions therefore allows one to vary the melting/solidification point in relatively wide limits. Apart from the melting point, the selection criteria for the lead alloys for making the filler body include its low cost and reasonably high thermal conductivity.

The melting/solidification point of the metal or alloy for making the filler body 17 also has to be higher than the activation temperature of the MH material loaded in the metal hydride containers 11. Importantly, the operating temperature of the MH material must be below its activation temperature, and the $H_2$ equilibrium pressure for the MH material at the operating temperature must be higher than the atmospheric pressure to provide $H_2$ supply to a fuel cell stack.

Summarising the above-mentioned, in the preferred embodiment of this invention, the material for making the filler body 17 is lead or a lead-containing alloy with melting/solidification point between 150 and 350° C., and the activation temperature of the metal hydride material is between 100 and 300° C. Most of the commonly used hydrogen storage alloys (e.g. $AB_5$- and $AB_2$-type) satisfy the latter criterion. Moreover, at the temperatures of 50-60° C. (typical operating temperature of low-temperature PEM fuel cell which can be thermally coupled with the MH storage, many of these alloys have a hydrogen equilibrium pressure in excess of 1 bar (100 kPa), which makes them suitable for the use in this invention.

As mentioned above, in the manufacturing of the MH hydrogen storage arrangement in accordance with the present invention entails a procedure of forming the filler body 17 by the use of "melting-solidification" route. This procedure is crucial, and the method of manufacturing the MH storage arrangement by way of this procedure is described below.

(a) The first step in the manufacturing of the MH storage arrangement entails the assembly of all its components (MH containers, heating/cooling means, gas manifold), except for the filler body, and the placement of such components in a shell or casting mould which, together with the components (MH containers, heating/cooling means, gas manifold), forms a pre-assembly of the metal hydride hydrogen storage arrangement. The MH containers and the heating/cooling means are first installed in their positions in the storage arrangement, followed by the installation of the gas manifold. Leak tests are then performed to test the integrity of the system.

Figure 2:
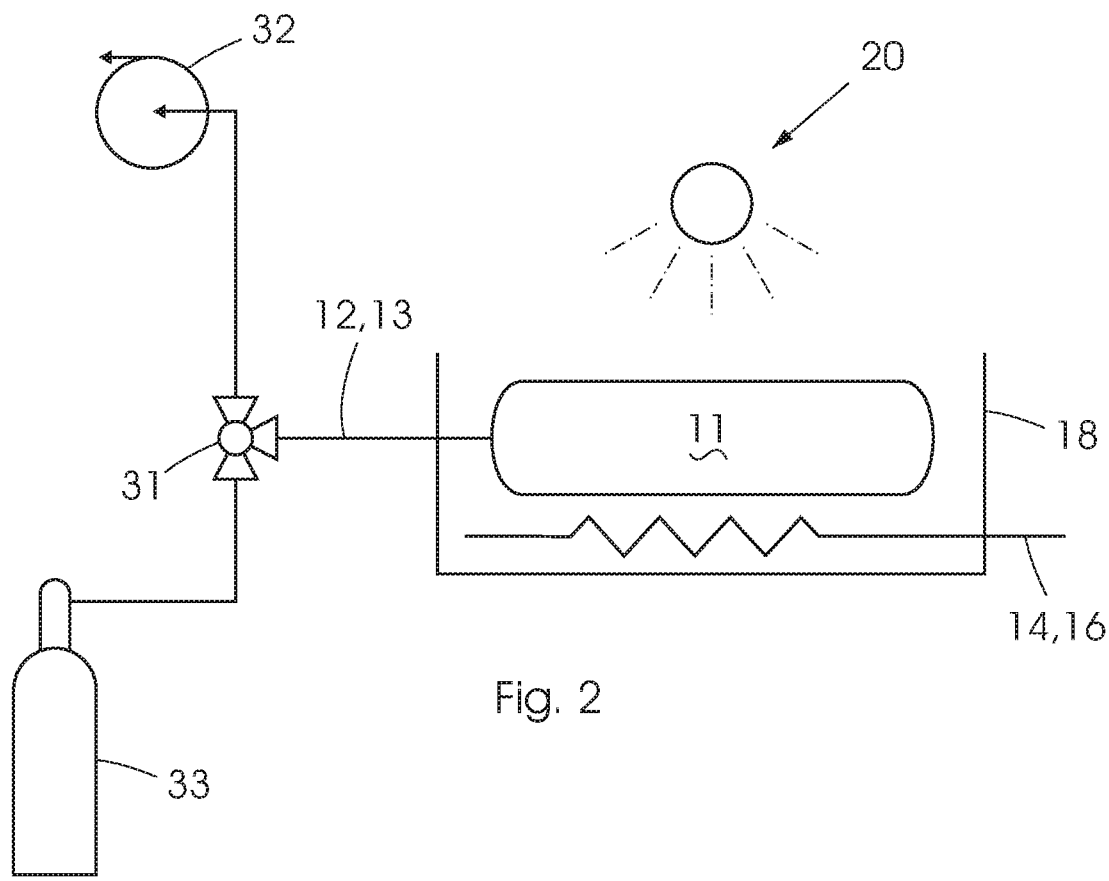
FIG. 2 is a schematic of the installation of a pre-assembly of the metal hydride hydrogen storage arrangement for use in manufacturing the hydrogen storage arrangement.

(b) The pre-assembly, as constructed above, is then located at the place where the casting/filling step will take place. This process requires heating of the assembly to elevated temperatures. Considering that all metal hydride materials are sensitive to a number of gas species (including oxygen and water vapours) that can remain in the inner space of the MH containers or desorb from the surface of the MH material during heating, the inner space of the containers must be evacuated at all times during the manufacturing process in order to avoid a loss or reduction of hydrogen sorption properties of the MH material due to its interaction with the gas species at elevated temperatures. In addition, the evacuation during the heating process will promote the activation of the MH material, so as to enable it to absorb and desorb hydrogen. FIG. 2 shows a schematic diagram of the installation of a pre-assembly of the metal hydride hydrogen storage arrangement for use in manufacturing the hydrogen storage arrangement. The assembly comprises a plurality of MH containers 11, and heating/cooling means (14-16) placed in-between the containers, with the containers and the hearing/cooling means all being located inside a shell or casting mould 18. The external conduit 13 that extends from the gas manifold 12 is connected to a common port of 3-way valve 31, which provides selective flow communication of the inner space of the MH containers 11 with a vacuum pump 32 or a gas cylinder 33. The evacuation of the inner space of the MH containers 11 has to be started before proceeding with steps (c)-(e) as described below, and is ceased only when step (e) has been completed. The reason for this is that when the containers 11 are at an elevated temperature, even a minor presence of air inside the MH containers 11 can result in the deterioration of the hydrogen sorption properties of the MH material. Moreover, during the steps (c)-(e) below the high temperature of the MH causes intensive desorption of impurities from the surface of the MH material (see example below) which must be removed by way of evacuation. During evacuation, it is recommended for the vacuum to be monitored in a gas system (see example below) that facilitates process control, and in particular, the moment when the evacuation can be ceased.

Figure 3:
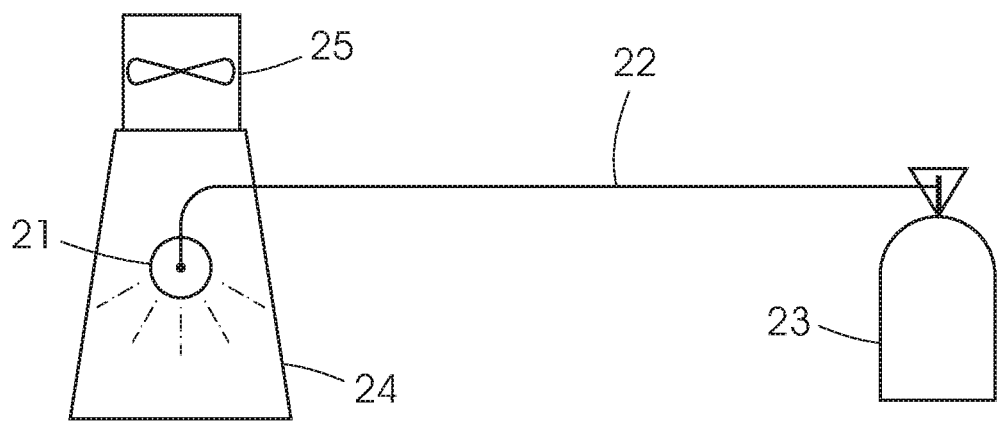
FIG. 3 is a schematic layout of a top heater comprising a gas burner and an air boosting chamber, according to one embodiment of the invention.

(c) The complete pre-assembly in the shell/casting mould 18, including the MH containers 11 and the heating/cooling means 14 require to be heated-up at the next stages of the process (c)-d). In the preferred embodiment of the invention the assembly is opened at the top, and is heated by way of forced convection from a heater and air blower 25. There is also provided for the pre-assembly to be heated from the bottom by way of auxiliary heating means (not shown), but heating from above is preferable as it provides more uniform heating of the inner elements (11, 14) of the assembly. The heater 20 can be a conventional gas burner, which has sufficient heating capacity to pre-heat the pre-assembly to the required temperature for a reasonable time. However, the use of a gas burner in isolation can result in the deposition of the products of incomplete combustion (e.g. soot) on the surface of the MH containers 11 and heating/cooling means 14 that can in turn result in poor adhesion of the solidified filler body, which will adversely impact on heat transfer performance. To avoid this, the top heater 20 can be incorporated into a heating assembly including an air boosting chamber as shown in FIG. 3. The gas burner 21, in this example supplied with natural gas via a gas conduit 22 from a gas cylinder 23 is located inside an air-boosting chamber 24 equipped with an air blower 25. The air flow created by the blower 25 will then boost the flame from the burner 21, thus resulting in complete combustion and dilution of combustion products with the air flow. When the rates of gas and air supply are properly adjusted, an intensive stream of hot air will emanate from the exit of the chamber, thus providing effective top heating of the pre-assembly.

During step (c), the pre-assembly is pre-heated as described above. The pre-heating temperature depends on the specific embodiment of the invention, and once such temperature is reached, step (d) follows.

(d) Referring again to FIG. 2, after pre-heating the pre-assembly of the storage arrangement in the shell/mould 18 is filled with a metal or alloy, which will form the filler body of the MH storage arrangement once solidified. The filler can be made in two alternative ways:

i. The metal/alloy is pre-melted and casted into the pre-assembly which has been pre-heated in step (c) to a temperature between ½ and ⅔ of the melting point of the metal or the alloy constituting the filler body. This methodology will be particularly suitable for mass production at specialised foundries equipped with the pre-melting and casting facilities. The fact that the maximum pre-heating temperature is below the solidification point of the filler material prevents any potential leakage through gaps which may remain in the shell 18 resulting from the pre-assembly being a multi-component object. Additionally, with the temperature being below ⅔ of the solidification point, the likelihood of the solidified melt sticking to the shell/mould 18 is significantly reduced. At the same time, the pre-heating temperature higher than ½ of the solidification point reduces the likelihood of the premature solidification of the melt.

ii. Alternatively, the metal/alloy can be loaded into the shell/mould 18, and pre-heated above its melting point while in particulate form. This embodiment requires continuation of the heating process as described in step (c) above. It does not require specialised pre-melting and casting facilities and can provide improved adhesion of the filler material to the surface of the MH containers 11 and the heating/cooling means 14. This will, in turn, result in even better heat transfer between the filler body, the containers, and the heating/cooling means. However, this methodology will entail special care in the manufacturing of the shell/mould 18 to avoid leakage of the molten metal, as well as to prevent the sticking of the solidified filler body to the shell.

(e) After the filler material has been introduced, the molten metal or alloy is allowed to cool down until it is complete solidified. It is important for the temperature to be as low as possible before the evacuation process (which started in step (b)) is interrupted. In practice, the temperature to which the filler body is cooled is a compromise between time and the requirement stated above. As a general rule, the cooling temperature should be below 100° C. At this temperature, the activation of most of the MH materials which can be used in this invention is completed.

(f) After the filler body has solidified and cooled down sufficiently, the evacuation is stopped and the inner volume of the containers 11 is filled with gas. Importantly, this step must take place immediately after the evacuation has been stopped, in order to avoid contamination of the activated MH inside the containers with air which can pass into the containers via microleaks. The gas must be pressurised to eliminate the possibility of creating "negative" pressure (below the atmospheric pressure) in the containers while they are cooling down. The recommended sequence of the operations during stage (f) is as follows:
  i. Open the gas cylinder 33;
  ii. Switch the 3-way valve 31 from the evacuation line (from vacuum pump 32) to the gas supply line (from cylinder 33).
  iii. Switch the vacuum pump 32 off.

In a preferred embodiment of the invention, the pressurised gas supplied to the MH containers during performing stage (f) is hydrogen. In this case the MH material, which has been thermally activated under vacuum during pre-heating (c) and whilst filing the pre-assembly with the metal or alloy (d), will absorb hydrogen and, after it has been cooled to room temperature, the MH storage arrangement will be fully charged. This option eliminates any contamination of the MH material and reduces the risk of deterioration of its hydrogen sorption performance to a minimum. However, at specialised foundries the use of hydrogen is often not allowed due to safety reasons. In this case, a pressurised inert gas (e.g. argon) can be used when performing stage (f). A third option can be to use a mixture of the inert gas with hydrogen (e.g. 10% $H_2$ in Ar) which can provide initial hydrogen saturation of the MH material and which, at the same time, does not introduce safety concerns because leaks of the gas mixture will not create fire-and-explosion hazardous concentration of hydrogen in the environment.

(g) Next, the pre-assembly (filled with the pressurised gas) is allowed to cool down to the room temperature.

(h) Finally, the metal hydride hydrogen storage arrangement is removed from the shell/casting mould 18. Importantly, before proceeding with this step the valve 31 should be switched to a closed position and left connected to the end of the gas pipeline 13 until the final installation of the MH storage arrangement has been completed.

If the gas with which the MH containers are filled during stage (f) is not pure hydrogen, the storage arrangement should also be subjected to the following final activation procedure:

(a) Release of the pressurised gas from the inner volume of the MH containers via the gas manifold. This can be done by opening the valve 32 in any position after disconnecting the same from the vacuum and gas supply lines. This should be done before the storage arrangement is removed from the shell/casting during step (f) above. After performing this procedure, the storage arrangement (and more particularly the MH containers) has to be connected to a final activation setup, the piping diagram of which is similar to the gas piping shown in FIG. 2. In this case, one of the free ports of the 3-way valve 31 is connected to the vacuum pump 32, and the other port is connected to a hydrogen cylinder 33.

(b) The storage containers are subsequently evacuated using the vacuum pump 32.

(c) Finally, the storage containers are filled with pressurised hydrogen from the cylinder 33 after the valve 31 has been switched from the vacuum pump 32 to the cylinder 33.

The MH storage arrangement and the method of manufacturing thereof as described above can be made as a single unit ready for integration into a utility vehicle. Alternatively, the storage arrangement can be made up of an assembly of several smaller modules made as described above. This option adds flexibility in making MH hydrogen storage arrangements for various utility vehicles based on a unified modular design that is beneficial for mass production.

EXAMPLE

The following example illustrates one of numerous embodiments of the present invention.

According to the design specification of a 15 kWe fuel cell power module for a 3.5 tonnes STILL electric forklift, a metal hydride hydrogen storage arrangement should:
  provide hydrogen storage capacity of 20 $Nm^3$ $H_2$;
  have a weight between 1 and 1.5 tonnes;
  occupy a volume not higher than 200 L; and
  not be longer than 1 m.

For the hydrogen storage arrangement, it was suggested to use 40 tubular metal hydride containers made as all-welded stainless steel structures, which will in use be filled with an $AB_2$-type hydrogen storage alloy characterised by a hydrogen equilibrium pressure of about 10 bar at room temperature and an activation temperature of between 150 and 300° C. Each container is 51.3 mm in diameter, 800 mm in length, 8.9 kg in weight (incl. MH material) and has a hydrogen storage capacity of about 0.5 $Nm^3$.

The assembly of the 40 MH containers staggered into a 200 L volume will have a weight of 356 kg. Had the empty space between containers been filled with water (as per one of the prior art configurations), the total weight of the hydrogen storage arrangement would have amounted to about 490 kg, which is far below the lower weight constraint of the application.

In order to adhere to the specification requirements, a metal hydride hydrogen storage arrangement according to the present invention has been designed. The storage arrangement is an assembly of 8 modules (MH cassettes) each comprising of 5 MH containers as described above. A 15 mm OD stainless steel heating/cooling pipe extends between the cassettes and the empty space is occupied by a filler body made of lead. The total storage arrangement dimensions (8 cassettes packed together) are 704 mm (L)× 960 mm (W)×264 mm (H) that corresponds to the total volume below 170 L. The target weight of one cassette was calculated to be between 125 and 187.5 kg, with the combined weight therefore exceeding the 1 ton requirement.

Figure 4:
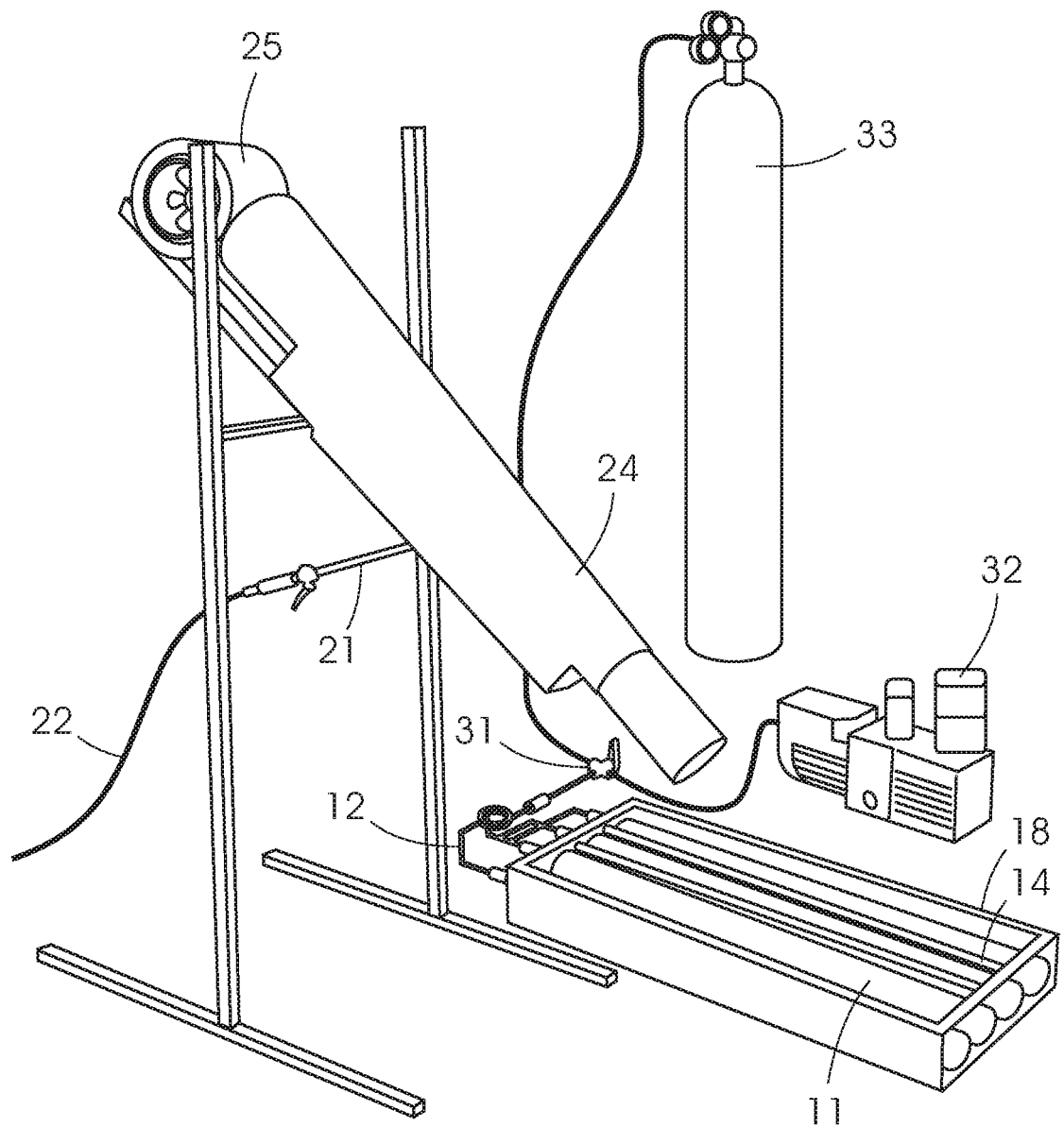
FIG. 4 is a perspective view of an example showing a pre-assembly of the metal hydride hydrogen storage arrangement prepared for the filling step.
Figure 5:
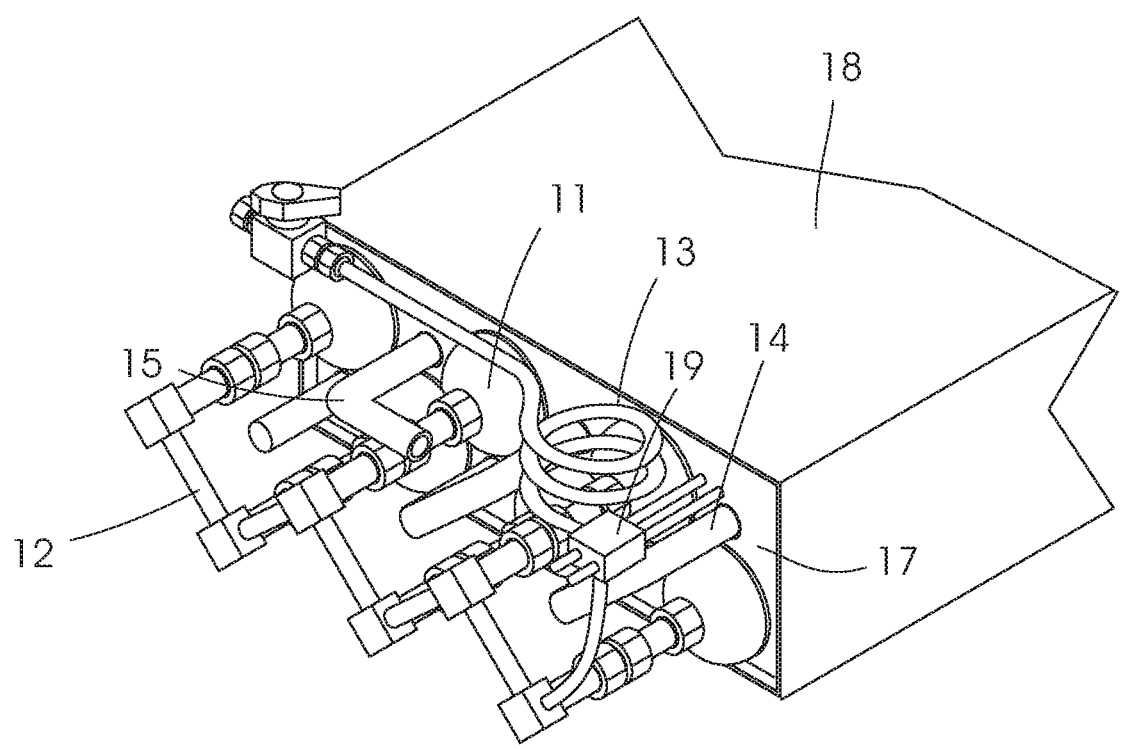
FIG. 5 is an enlarged perspective view of part of the metal encased storage arrangement in accordance with the present invention.

FIG. 4 shows a pre-assembly of the MH cassette prepared for the casting of the lead filler body. The MH containers 11, together with the heating/cooling pipe 14, are pre-assembled in a removable shell 18 made of stainless steel sheets, and which envelopes the MH containers and the pipes with the exception of the gas manifold 12 and the welded joints between the cooling pipes 14. The total weight of the cassette/pre-assembly before casting of the lead filler body was about 45 kg. The gaps in the shell were sealed by a high-temperature sealant to avoid spillage of the molten lead during the manufacturing process.

FIG. 4 also shows some other accessories used when filling the pre-assembly with lead, including a top heater as discussed above. The pre-assembly was located on a support, and exposed to two auxiliary bottom gas burners which provided some auxiliary heating.

Before depositing the lead filler, the assembly was evacuated. After achieving a vacuum of about $10^{-2}$ mbar, the assembly was pre-heated up to about 170° C. (temperature measurement by a K-type thermocouple built into cassette, also assisted by optical pyrometer). The pre-melted lead (T~350° C.) was then casted into the pre-assembly. During pre-heating (20 min) and casting the molten lead (30 min) the pressure in the evacuated system increased to 2 mbar followed by the gradual decrease to 0.1 mbar before the end of the casting step.

After finishing the lead casting, the heaters were switched off, and the lead-filled cassette was allowed to cool down to a temperature of about 90° C., at which point the vacuum was in excess of $5.10^{-2}$ mbar. The cassette was then filled with pressurised argon at a pressure of about 50 bar.

After cooling the lead encased and argon-filled cassette to room temperature, the stainless steel sheets making up the shell 18 were removed, and the module of the metal hydride hydrogen storage arrangement (960×269×88 mm; weight 144 kg) was connected to a final activation setup. During final activation, the argon was first released, and the containers where then again evacuated to about $3.10^{-2}$ mbar. Hydrogen at a supply pressure of about 50 bar was then supplied to the gas manifold 12. Hydrogen absorption in the MH started immediately, as was evident from the gradual increase of the temperature of the storage arrangement measured by a built-in K-type thermocouple 19. The hydrogen was introduced at maximum $H_2$ flow, which in this case was 40 NL/min (upper limit set by mass flow controller due to necessity to be within its measurement range). The $H_2$ flow of 40 NL/min remained unchanged during 40 minutes followed by a gradual decrease in flowrate when the temperature reached about 60° C. (increased from an initial temperature of 25° C.). After the cooling of the storage arrangement commenced (using water at a temperature of about 20° C. and a flow rate of about 5 L/min), the flow of the absorbed $H_2$ (40 NL/min) increased again, and remained constant for a further 10 min followed by a gradual decrease. The total amount of hydrogen absorbed in the storage arrangement during 100 minutes (until the $H_2$ flow rate decreased below 4 NL/min) was of 2591 NL (calculated by the integration of time dependence of the flow rate). This was more than the specification requirement (2500 NL).

The example presented above demonstrates the workability of the engineering solution described in the present invention even in the case where the best possible embodiment could not be used (due to the incomplete encapsulation of the storage arrangement components within the filler body, use of argon instead of hydrogen to fill the inner volume of the MH containers after its solidification, and the modest heat conductivity of the metal used).

The inventors foresee that the practical application of the invention can be further improved by the optimisation of the composition of the alloy forming the filler body (increase of the thermal conductivity without a significant decrease of the density and increase in the cost), and the improvement of the design of the storage arrangement and the auxiliary accessories (casting mould, top heater), etc.

The present invention offers a design and a method of manufacturing a compact hydrogen storage arrangement which will be useful in a number of fuel cell powered heavy duty vehicles including material handling units, mining locomotives, and marine applications. The use of the invention will also result in the reduction or elimination of space occupied by ballast in these kind of vehicles, thus adding flexibility to the layout of other components (stack+BoP) of the fuel cell power modules which can in turn be improved in terms of ease of assembly and service.

The solution of the problem of the increase of space available for the placement of a fuel cell and its BoP within weight and space constrains of a utility vehicle resides in "merging" the ballast and the metal hydride hydrogen storage system in an integrated design resulting in a unified hydrogen storage arrangement. The invention is inventive, in that it departs from the conventional design methodology of MH storage systems, in which the aim is to reduce the weight of the fuel storage arrangements. At the same time, the integrated system will also provide efficient heating and cooling of the MH material to provide sufficient rates of $H_2$ desorption/absorption during the $H_2$ discharge/charge. Finally, the procedure of making the MH hydrogen storage arrangement has to be simple, cost-efficient, safe and reliable—including the elimination of a possibility of deterioration of hydrogen sorption properties of the MH material during the manufacturing of the storage arrangement. The present invention meets all these criteria.

It will be appreciated that the above is only one embodiment of the invention and that there may be many variations without departing from the spirit and/or the scope of the invention. It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

What is claimed is:

1. A metal hydride hydrogen storage arrangement suitable for use as a counterweight in a fuel cell utility vehicle, the storage arrangement including:
   a plurality of metal hydride containers filled with a metal hydride material, the containers being connectable in parallel to a gas manifold, wherein the metal hydride material has a hydrogen equilibrium pressure in excess of 100 kPa at a temperature of between 50° C. and 60° C., and wherein an operating temperature of the metal hydride material is below its activation temperature;
   heating and cooling means located between the metal hydride containers; and
   a filler body formed by the melting and solidification of a metal or an alloy in a space between the metal hydride containers and the heating and cooling means,
   wherein the filler body adjoins the surfaces of the heating and cooling means and the metal hydride containers to enable heat exchange between the metal hydride containers and the heating and cooling means.

2. The metal hydride hydrogen storage arrangement of claim 1 in which the metal or the alloy used for the filler body has a melting/solidification point below the maximum allowed operation temperature of the metal hydride container, but above the activation temperature of the metal hydride material inside the metal hydride container.

3. The metal hydride hydrogen storage arrangement of claim 2 in which the metal or the alloy which forms the filler body is a lead or a lead alloy with a melting point between 150 and 350° C., thermal conductivity above 35 W/(m·K) and a density above at least 8 kg/L.

4. A method of manufacturing a metal hydride hydrogen storage arrangement suitable for use in a fuel cell utility vehicle, the method including the steps of:
   locating a plurality of metal hydride containers, filled with a metal hydride material, and heat transfer means inside a casting mould to form a pre-assembly;
   evacuating an inner space of the containers;
   filling a space between the containers and the heat transfer means with a filler material by way of a melting and solidification process in which the filler material is heated to a temperature higher than the activation temperature of the metal hydride;
   allowing the filler material to cool and solidify; and
   removing the casting mould.

5. The method of claim 4 in which the step of filling the space between the containers and the heat transfer means with a filler material to include the steps of:
   pre-heating the pre-assembly;
   filling the space between the containers and the heat transfer means with the filler material;
   cooling the pre-assembly filled with the filler material to a temperature below the melting/solidification point;
   stopping the evacuating of the inner volume of the metal hydride containers;
   filling the inner volume of the metal hydride containers via the gas manifold with a pressurised gas; and
   cooling the pre-assembly filled with the solidified filler material and the pressurised gas to room temperature.

6. The method of claim 5 in which the pre-assembly of the metal hydride hydrogen storage arrangement may be open at the top, and wherein the pre-heating step is carried out by directing a flow of hot air onto the top of the pre-assembly.

7. The method of claim 5 wherein the step of pre-heating the pre-assembly is continued until reaching a temperature of between a half and two thirds of the melting point of the metal or the alloy which forms the filler body.

8. The method of claim 5 wherein the pressurised gas is hydrogen, an inert gas, or a mixture of hydrogen and an inert gas.

9. The method of claim 5 in which the pressurised gas is not hydrogen, the method in this instance including a final activation procedure which includes the steps of:
   releasing the pressurised gas from the inner volume of the containers via the gas manifold;
   evacuating the inner volume of the containers via the gas manifold; and
   filling the inner volume of the containers with pressurised hydrogen via the gas manifold.

10. A metal hydride hydrogen storage arrangement including a plurality of storage arrangements as described in claim 1.

11. A utility vehicle including a counterweight, characterized in that the counterweight is defined by the metal hydride hydrogen storage arrangement as described in claim 1.

* * * * *